United States Patent [19]

Matsumoto et al.

[11] 4,358,886
[45] Nov. 16, 1982

[54] METHOD OF MOUNTING AN AZIMUTH INDICATOR IN AN AUTOMOBILE

[75] Inventors: Muneaki Matsumoto, Okazaki; Koji Numata, Toyokawa; Akira Kuno, Oobu, all of Japan

[73] Assignee: Nippon Soken, Inc., Nishio, Japan

[21] Appl. No.: 133,922

[22] Filed: Mar. 25, 1980

[30] Foreign Application Priority Data

Jun. 21, 1979 [JP] Japan .......................... 54-85430[U]
Nov. 30, 1979 [JP] Japan .......................... 54-166252[U]

[51] Int. Cl.³ ...................... B23P 15/00; H01F 41/00
[52] U.S. Cl. ...................................... 29/428; 29/407; 361/149; 361/267
[58] Field of Search ............... 29/428, 407, 592 R; 33/356, 363 R, 363 K, 363 L, 363 N, 363 Q; 361/267, 149

[56] References Cited

U.S. PATENT DOCUMENTS

| 250,273 | 11/1881 | Maxim | 361/149 |
|---|---|---|---|
| 1,867,812 | 7/1932 | Dodd et al. | 33/356 |
| 2,355,940 | 8/1944 | Zuschlng | 361/267 |
| 2,460,684 | 2/1949 | Farrow | 361/267 |
| 2,481,392 | 9/1949 | Camras | 361/267 |

FOREIGN PATENT DOCUMENTS 636827 2/1962 Canada .............................. 361/149

OTHER PUBLICATIONS

Michel, Nicholas B., "Shipboard Degaussing Installations for Protection Against Magnetic Mines" from AIEE Technical Paper 48-227, Aug. 1948.

*Primary Examiner*—Daniel C. Crane
*Attorney, Agent, or Firm*—Cushman, Darby & Cushman

[57] ABSTRACT

A method for demagnetizing an automobile is disclosed in which the terrestrial magnetism is detected by a direction-detecting sensor and the running direction of the automobile is indicated in response to a signal produced from the direction-detecting sensor. The distortion of the magnetic field caused by the permanent magnetism of the magnetic materials of the whole body of the automobile is erased by placing the automobile in an AC magnetic field which gradually increases from zero to a predetermined intensity and then gradually decreases to zero, and thereafter the direction-detecting sensor is mounted at the magnetic center of the automobile.

6 Claims, 4 Drawing Figures

4,358,886

METHOD OF MOUNTING AN AZIMUTH INDICATOR IN AN AUTOMOBILE

BACKGROUND OF THE INVENTION

The present invention relates to a method for demagnetizing an automobile carrying an azimuth indicator or a bearing indicator, or more in particular to a method for demagnetizing the whole automobile equipped with an azimuth indicator for indicating the running direction of the automobile without correcting the distortion of the magnetic field caused by the residual magnetism of the automobile or the like.

In conventional azimuth indicators for automobiles, after a direction-detecting sensor is mounted on it, any distortion of the magnetic field caused by the residual magnetism of the automobile is corrected by a correcting magnet mounted on the outside of the automobile in order to detect a direction accurately.

In the conventional configuration it is necessary to consider many factors including the position, number and intensity of the correcting magnet mounted on the outside of the automobile in order to eliminate the distortion of the magnetic field which is caused by the residual magnetism or the like of the automobile, thus complicating the correcting processes. Further, different corrections are required for different automobiles due to the variation in the characteristics of the distortion of the magnetic field from one automobile to another.

SUMMARY OF THE INVENTION

Accordingly, it is an object of the present invention to provide a method for demagnetizing an automobile equipped with an azimuth indicator in which before mounting a direction-detecting sensor at the magnetic center of the automobile, the distortion of the magnetic field caused by the permanent magnetism of the whole automobile including such magnetic materials as the steel body and other equipments is eliminated, and in this way the running direction of the automobile is capable of being accurately detected without any correction of the magnetic field which otherwise might be required by an external magnet or the like, thus obviating the above-mentioned disadvantages of the conventional automobile azimuth indicators.

According to one aspect of the present invention, there is provided a method for demagnetizing the automobile having an azimuth indicator in which the distortion of the magnetic field caused by the permanent magnet of the magnetic materials of the automobile is eliminated by an AC magnetic field alone or by using both DC and AC magnetic fields. In the latter method, an external magnetic field is demagnetized by the DC magnetic field and any distortion of the magnetic field in the region of the external magnetic field thus demagnetized is eliminated by the AC magnetic field, thus making it possibly to eliminate the distortion of the magnetic field more completely.

According to this invention, the fact that the whole automobile is demagnetized and a direction-detecting sensor is mounted at the magnetic center thereof eliminates the residual magnetism of the automobile without any correcting magnet which otherwise might be required to be mounted on the outside of each automobile. Further, the running direction of the automobile is detected accurately without being substantially affected by the distortion of the magnetic field or the induction field of the terrestrial magnetism.

DESCRIPTION OF THE PREFERRED EMBODIMENTS

Embodiments of the present invention will be described below with reference to the accompanying drawings.

Figure 1:
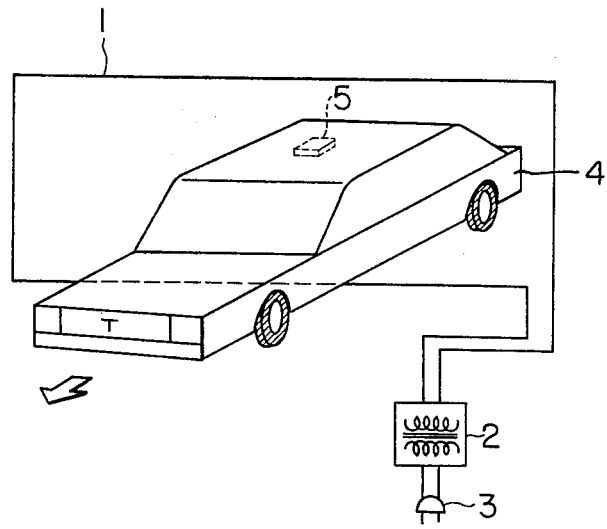
FIG. 1 is a perspective view of an arrangement for carrying out a first embodiment of the present invention.

The diagram of FIG. 1 shows a demagnetizing system for an automobile 4 and the position of a direction-detecting sensor 5 according to a first embodiment of the present invention. Reference numeral 1 shows a coil for generating an AC magnetic field. The ends of the coil 1 are connected to a voltage-variable transformer 2 thereby to produce an AC magnetic field of the desired intensity. A power plug 3 is impressed with a commercial, 60 HZ, AC, 100 V supply voltage as in ordinary home use. By changing the output voltage of the transformer 2, the AC magnetic field produced from the coil 1 is increased from zero to approximately 700 AT gradually and is then decreased gradually to zero. While the AC magnetic field is thus changed the automobile is rotated for several times within the coil 1, and thereby the distortion of the magnetic field of the whole automobile is eliminated.

Next, a direction-detecting sensor 5 is mounted at the center of the ceiling which provides a magnetic center of the automobile, thus indicating the exact running direction of the automobile at an indication section as described later. In the case of an automobile about 1.5 tons in weight, by way of example, an AC magnetic field excited to a maximum of about 700 AT is required.

Now, the configuration and operation of an azimuth indicator having a direction-detecting sensor 5 will be explained.

Figure 2:
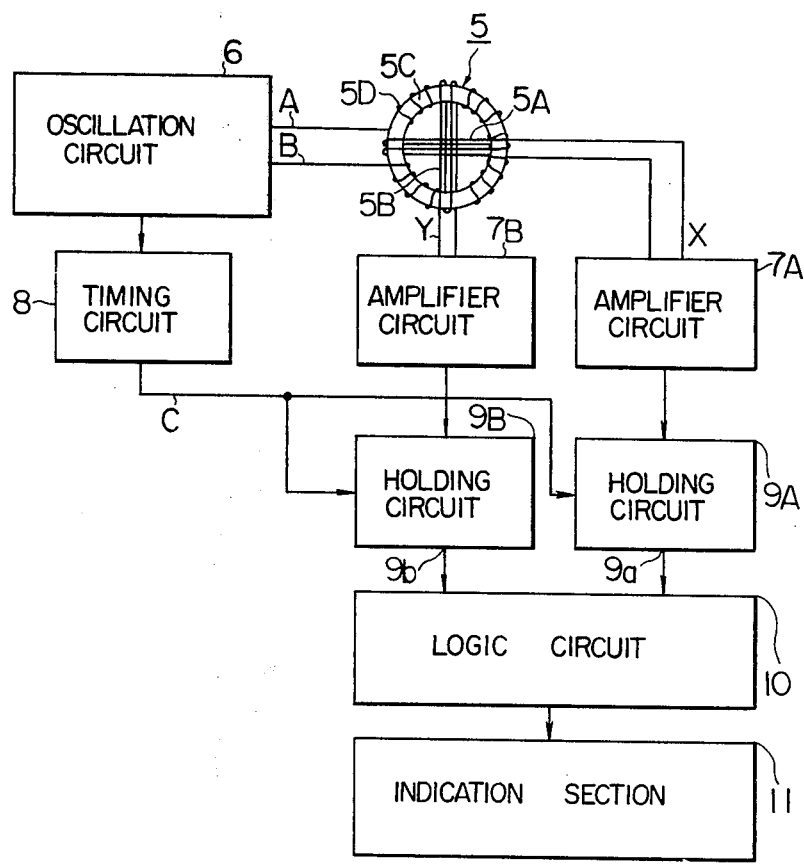
FIG. 2 is a diagram showing a configuration of the automobile azimuth indicator mounted on the automobile of FIG. 1.
Figure 3:
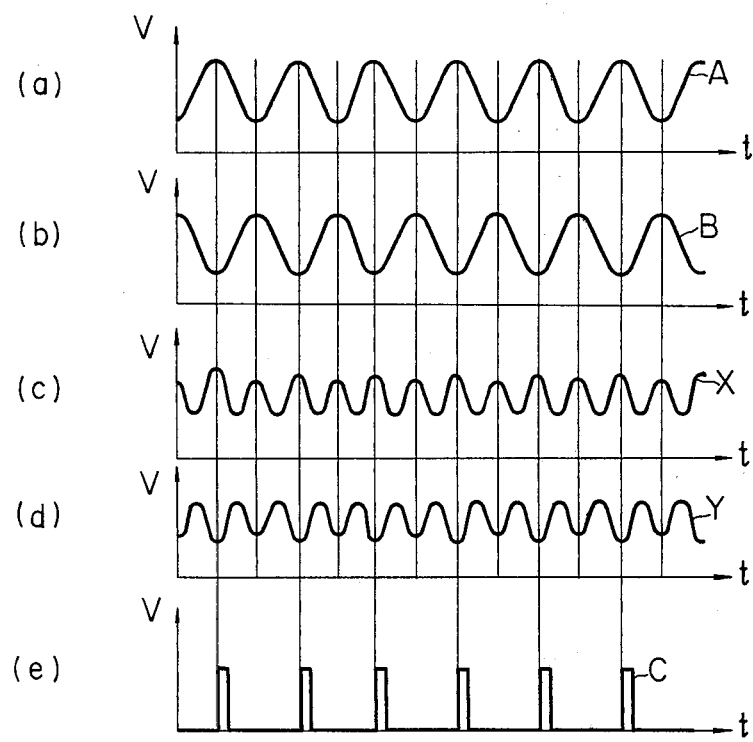
FIG. 3 shows signal waveforms produced at the respective parts of the azimuth indicator carried on the automobile shown in FIG. 2.

In the configuration shown in FIG. 2, the direction-detecting sensor 5 includes a magnetic core 5C of a ferromagnetic material, an exciting coil 5D and detecting coils 5A, 5B wound thereon. An oscillation circuit 6 produces symmetric AC signals A and B (as shown by (a) and (b) of FIG. 3) for exciting the exciting coil 5D at a frequency f. The magnetic field within the magnetic core 5C changes by an influence of the terrestrial magnetism, so that outputs X and Y (as shown by (c) and (d) of FIG. 3) proportional to the intensity of the terrestrial magnetism are produced from the detecting coils 5A and 5B respectively. The outputs X and Y from the detecting coils change and in accordance with the position of the direction-detecting sensor, i.e., the running direction of the automobile. The outputs X and Y are amplified by amplifier circuits 7A and 7B and sampled and held by sample-hold circuits 9A and 9B in response to the signal C (as shown by (e) of FIG. 3) from the timing circuit 8. As a result, the output voltages at the points 9a and 9b change in proportion to the outputs X and Y of the direction-detecting sensor 5. In view of the fixed relation between the position of the direction-detecting sensor 5 and the voltages at output terminals 9a and 9b of the sample-hold circuits 9A and 9B, the running direction of the automobile is discriminated by use of a logic circuit 10 and is indicated appropriately by the indication section 11.

The direction-detecting sensor 5 is arranged in such a manner that the central axis of the annular magnetic core 5C is vertical, that is, in such a manner that the plane of the magnetic core is parallel with the horizontal ceiling of the automobile. The reason for which the direction-detecting sensor 5 is installed on the automobile ceiling is that parts inside the bonnet are affected by the magnetic field of a dynamo or the like and the inside parts of the trunk room are incapable of sensing the terrestrial magnetism due to magnetic shielding. On the other hand, the automobile ceiling is capable of receiving the terrestrial magnetism on one hand and is not affected by undesired magnetisms on the other hand.

Figure 4:
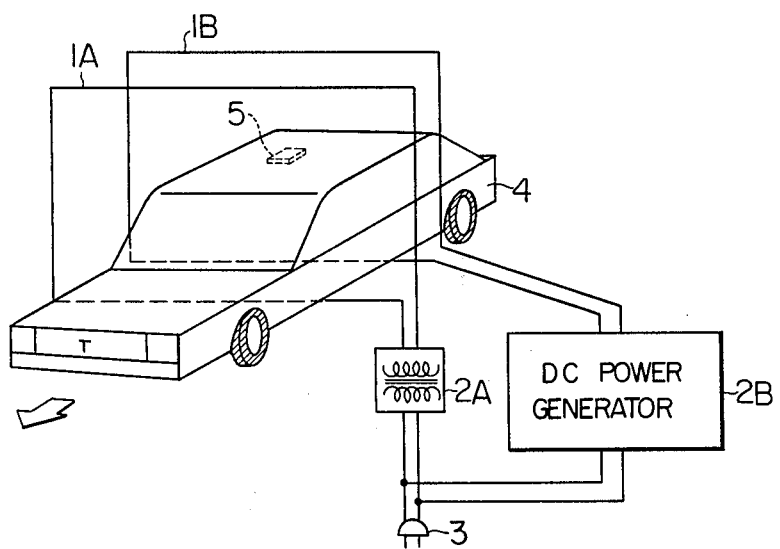
FIG. 4 is a perspective view of an arrangement for carrying out a second embodiment of the present invention.

The diagram of FIG. 4 shows a configuration of the demagnetizing system for the automobile 4 according to a second embodiment. Numeral 1A designates a coil for generating an AC magnetic field. The ends of the coil 1A are connected to a voltage-variable transformer 2A thereby to produce an AC magnetic field of the desired intensity. Numeral 1B designates a coil for generating a DC magnetic field, which has ends connected to a voltage-controllable DC power generator 2B thereby to produce a DC magnetic field of the desired intensity. A power plug 3 is impressed with a commercial 60 Hz AC 100 V supply voltage as in ordinary home use. The coil 1B is one for generating the DC magnetic field in a south-to-north direction and generates an intensity of the magnetic field which is almost the same as that of the terrestrial magnetism, whereby the external magnetic field is erased. The AC magnetic field is gradually increased from zero to about 700 AT in intensity by the coil 1A and is then gradually decreased to zero, thus erasing the distortion of the magnetic field of the automobile 4. In this case, the distortion of the magnetic field is completely eliminated in view of the fact that the AC magnetic field is applied after the erasure of the external magnetic field. In the experiments conducted by the inventors, a satisfactory result was obtained when the AC magnetic field is increased in intensity from zero to 700 AT over the duration of about 30 seconds and is then decreased over the duration of about 30 seconds to zero.

Next, the direction-detecting sensor 5 is mounted substantially at the center of the ceiling providing the magnetic center of the automobile, so that the accurate running direction of the automobile is indicated at the indication section 11 in a manner similar to the first embodiment mentioned above. By the way, the DC magnetic field for erasing the external magnetism such as the terrestrial magnetism requires the exciting capacity of 60 to 70 AT. In the case of an automobile about 1.5 tons in weight, for instance, an AC magnetic field excited to about a maximum of 700 AT is required for the purpose of demagnetization as in the first embodiment.

We claim:

1. A method for mounting an azimuth indicator on an automobile for indicating the running direction of the automobile in response to a signal from a direction-detecting sensor which detects terrestrial magnetism, comprising the steps of:
    generating an AC magnetic field which is gradually increased in intensity from zero to a predetermined level and then gradually decreased by zero by use of a coil;
    rotating the automobile several times during the change of said AC magnetic field within said coil thereby demagnetizing the whole of said automobile; and
    mounting said azimuth indicator at the magnetic center of said automobile.

2. A method for mounting an azimuth indicator on an automobile for indicating the running direction of the automobile in response to a signal from a direction-detecting sensor which detects terrestrial magnetism, comprising the steps of:
    generating a DC magnetic field by use of a coil which opposes and cancels the effect of terrestrial magnetism;
    generating an AC magnetic field which is increased gradually from zero to a predetermined intensity and is then gradually decreased to zero by use of a coil;
    inserting said automobile into said generated magnetic fields during the change of the AC magnetic field within said coil thereby demagnetizing the whole of said automobile; and
    mounting said azimuth indicator at the magnetic center of said automobile.

3. A method according to claim 1 or 2, wherein the magnetic center of the automobile is located substantially at the center of the ceiling of the automobile, and including the step of mounting the direction-detecting sensor substantially at the center of the automobile ceiling in such a manner that the central axis of the magnetic core of said direction-detecting sensor for detecting terrestrial magnetic is vertical.

4. A method for mounting an azimuth indicator for use in an automobile, said indicator having a direction-detecting sensor for producing a detection signal, circuit means for processing the detection signal and for producing a determining signal representative of the running direction of the automobile and indication means for indicating the running direction of the automobile in response to the determining signal from said circuit means, said method comprising the steps of:
    generating an AC magnetic field by gradually increasing the intensity of the AC magnetic field from zero to a predetermined level and then gradually decreasing said AC magnetic field to zero by using a coil;
    placing the automobile into the generated AC magnetic field;
    rotating the automobile several times within the generated AC magnetic field of the coil thereby eliminating the magnetic distortion of the whole automobile; and
    mounting said azimuth indicator at the magnetic center of the automobile.

5. A method for mounting an azimuth indicator for use in an automobile, said indicator having a direction-detecting sensor for producing a detection signal, circuit means for processing the detection signal and for producing a determining signal representative of the running direction of the automobile and indication means for indicating the running direction of the automobile in response to the determining signal from said circuit means, said method comprising the steps of:

generating a DC magnetic field by use of a coil which opposes and cancels the effect of an external magnetic field;

generating an AC magnetic field which is increased gradually from zero to a predetermined intensity and is then gradually decreased to zero by using a coil;

placing the automobile into the generated AC and DC magnetic fields thereby eliminating the magnetic distortion of the whole automobile; and mounting said azimuth indicator at the magnetic center of the automobile.

6. A method for mounting an azimuth indicator for use in an automobile according to claim 4 or 5, including the step of mounting said direction-detecting sensor substantially at the center of the automobile ceiling in such a manner that the central axis of the magnetic core of said direction-detecting sensor for detecting the terrestrial magnetism is vertical.

* * * * *